United States Patent
Lee (10) Patent No.: US 12,291,068 B2
(45) Date of Patent: May 6, 2025

(54) APPARATUS FOR CORNERING CONTROL OF VEHICLE AND METHOD THEREOF

(71) Applicant: HL MANDO CORPORATION, Gyeonggi-do (KR)

(72) Inventor: Jaegon Lee, Gyeonggi-do (KR)

(73) Assignee: HL Mando Corporation, Gyeonggi-do (KR)

( * ) Notice: Subject to any disclaimer, the term of this patent is extended or adjusted under 35 U.S.C. 154(b) by 302 days.

(21) Appl. No.: 18/102,081

(22) Filed: Jan. 27, 2023

(65) Prior Publication Data

US 2023/0241939 A1 Aug. 3, 2023

(30) Foreign Application Priority Data

Jan. 28, 2022 (KR) .................. 10-2022-0012848

(51) Int. Cl.
*B60G 17/016* (2006.01)
*B60G 17/08* (2006.01)

(52) U.S. Cl.
CPC ......... *B60G 17/0162* (2013.01); *B60G 17/08* (2013.01); *B60G 2400/104* (2013.01); *B60G 2400/34* (2013.01); *B60G 2400/41* (2013.01); *B60G 2400/518* (2013.01); *B60G 2500/10* (2013.01)

(58) Field of Classification Search
CPC ............... B60G 17/0162; B60G 17/08; B60G 17/0164; B60G 2400/104; B60G 2400/34; B60G 2400/41; B60G 2400/518; B60G 2500/10

See application file for complete search history.

(56) References Cited

U.S. PATENT DOCUMENTS

2018/0208012 A1* 7/2018 Molitor ............... B60W 30/045
2022/0388485 A1* 12/2022 Hirao ..................... B60G 17/08
2023/0364958 A1* 11/2023 Gerlach ............. B60G 17/0162

FOREIGN PATENT DOCUMENTS

KR 10-1905568 10/2018

* cited by examiner

*Primary Examiner* — Jacob M Amick
(74) *Attorney, Agent, or Firm* — WOMBLE BOND DICKINSON (US) LLP (57) ABSTRACT

An apparatus for controlling cornering of a vehicle includes a control unit configured to receive a plurality of vehicle signals output from the input unit, to output each of damping forces obtained through a plurality of controls performed on the basis of the plurality of vehicle signals, and to output a damping force variation calculated through a cornering control performed on the basis of some of the plurality of vehicle signals, an adjustment unit configured to apply the damping force variation output from the control unit to an integrated damping force and then output a final damping force, and a damping unit configured to receive a changed current signal of the final damping force and then adjust a damping force of a damper. The damping force of the damper of the damping unit is controlled to be reduced when it is determined that the vehicle enters circuit cornering.

16 Claims, 7 Drawing Sheets

APPARATUS FOR CORNERING CONTROL OF VEHICLE AND METHOD THEREOF

CROSS-REFERENCE TO RELATED APPLICATIONS

This application claims benefit and priority to Korean Patent Application No. 10-2022-0012848, filed on Jan. 28, 2022, with the Korean Intellectual Property Office, the disclosure of which is incorporated herein in its entirety by reference.

TECHNICAL FIELD

The present disclosure relates to an apparatus and method for controlling the cornering of a vehicle and, more particularly, to an apparatus and method for controlling the cornering, which are specialized for the circuit driving of a vehicle.

BACKGROUND

Generally, an apparatus for controlling the cornering of a vehicle determines a cornering state on the basis of the lateral acceleration of the vehicle, and performs control by adjusting the damping force of a suspension according to the magnitude of the lateral acceleration.

In the related art including Korean Patent No. 10-1905568, straight-driving and quick-turning logic is applied when cornering. That is, this controls to increase the damping force of the suspension so as to improve straight driving performance after quick turning by minimizing the roll rate when the vehicle performs cornering.

Recently, as a high-performance vehicle has actively developed, there is a need to improve the circuit driving performance. Cornering during circuit driving is different from cornering during normal driving.

In the normal driving, the damping force of the suspension is controlled to be increased so as to improve the straight driving performance after quick turning when the vehicle performs cornering driving. However, in the circuit driving, it is necessary to reduce the damping force of the suspension so as to minimize load movement when the vehicle performs cornering driving.

However, the number of consumers who enjoy circuit driving with high-performance vehicles is increasing, but the reality is that there is no control logic of an Electronic Controlled Suspension (ECS) specialized for circuit driving.

Therefore, there is a need to develop the logic of cornering control during circuit driving which is different from cornering control during normal driving.

DOCUMENTS OF RELATED ART (Patent Document 1) KR 10-1905568 (Oct. 8, 2018)

SUMMARY

Accordingly, the present disclosure has been made keeping in mind the above problems occurring in the related art, and an objective of the present disclosure is to provide an apparatus and method for controlling the cornering of a vehicle, which determine circuit cornering driving and adjust the damping force of a suspension.

The present disclosure provides an apparatus for controlling cornering of a vehicle, the apparatus including an input unit configured to sense and output a plurality of vehicle signals, a control unit configured to receive the plurality of vehicle signals output from the input unit, to output each of damping forces obtained through a plurality of controls performed on the basis of the plurality of vehicle signals, and to output a damping force variation calculated through a cornering control performed on the basis of some of the plurality of vehicle signals, an integration unit configured to integrate each of the damping forces output from the control unit, and to output an integrated damping force, an adjustment unit configured to apply the damping force variation output from the control unit to the damping force output from the integration unit and then output a final damping force, a command unit configured to receive the final damping force output from the adjustment unit and then output a changed current signal, and a damping unit configured to receive the current signal output from the command unit and then adjust a damping force of a damper. The damping force of the damper of the damping unit may be controlled to be reduced when it is determined that the vehicle enters circuit cornering through the cornering control.

Further, the plurality of vehicle signals sensed by the input unit may include signals of 6-axis acceleration, wheel acceleration, wheel speed, steering angle, steering speed, accelerator pedal displacement, and cylinder pressure.

Further, said some of the signals which are the basis for performing the cornering control in the control unit may include signals of lateral acceleration variation, accelerator pedal displacement, and cylinder pressure.

Further, said some of the signals which are the basis for performing the cornering control may further include a steering angle.

The present disclosure provides a vehicle cornering control method for determining cornering driving of a vehicle, the method including a cornering entry standby determining step of determining whether a cornering entry standby determination requirement of the vehicle is satisfied during normal driving, and returning to a normal driving state when the cornering entry standby determination requirement is not satisfied, a cornering entry standby step performed when the cornering entry standby determination requirement is satisfied, a cornering entry control determining step of determining whether a cornering entry control determination requirement is satisfied, and changing to a normal driving state when the cornering entry control determination requirement is not satisfied, a cornering entry control step performed when the cornering entry control determination requirement is satisfied, a cornering escape determining step of determining whether a cornering escape determination requirement is satisfied, and changing to the cornering entry standby step when the cornering escape determination requirement is not satisfied, a cornering escape control step performed when the cornering escape determination requirement is satisfied, and a cornering escape end determining step of determining whether a cornering escape end determination requirement is satisfied, changing to the cornering entry standby step when the cornering escape end determination requirement is satisfied, and changing to the cornering entry control step when the requirement is not satisfied. A damping force of a damper may be controlled to be reduced in the cornering entry control step.

The present disclosure provides a vehicle cornering control method for determining cornering driving of a vehicle, the method including a cornering entry standby determining step of determining whether a cornering entry standby determination requirement of the vehicle is satisfied during normal driving, and returning to a normal driving state when the cornering entry standby determination requirement is not satisfied, a cornering entry standby step performed when the cornering entry standby determination requirement is satisfied, a cornering entry control determining step of determining whether a cornering entry control determination requirement is satisfied, and changing to a normal driving state when the cornering entry control determination requirement is not satisfied, a cornering entry control step performed when the cornering entry control determination requirement is satisfied, a cornering entry standby determining step of determining whether a cornering entry standby determination requirement is satisfied, and changing to the cornering entry standby step when the cornering entry standby determination requirement is not satisfied, a cornering escape determining step performed when the cornering entry standby determination requirement is satisfied, determining whether a cornering escape determination requirement is satisfied, and changing to the cornering entry standby step when the cornering escape determination requirement is not satisfied, a cornering escape control step performed when the cornering escape determination requirement is satisfied, a cornering entry control determining step of determining whether a cornering entry control determination requirement is satisfied, and changing to the cornering entry control step when the cornering entry control determination requirement is not satisfied, and a cornering escape end determining step performed when the cornering entry control determination requirement is satisfied, determining whether a cornering escape end determination requirement is satisfied, changing to the cornering entry standby step when the cornering escape end determination requirement is satisfied, and changing to the cornering entry control step when the requirement is not satisfied. A damping force of a damper may be controlled to be reduced in the cornering entry control step.

Further, the cornering entry standby determination requirement of the vehicle may be whether cylinder pressure is greater than a reference value or accelerator pedal displacement is greater than a reference value.

Further, the cornering entry control determination requirement may be whether lateral acceleration variation is greater than a reference value.

Further, the cornering entry standby determination requirement may be whether a steering angle is greater than a reference value.

Further, the cornering escape determination requirement may be whether the accelerator pedal displacement is greater than a reference value and the lateral acceleration variation is less than a reference value.

Further, the cornering entry control determination requirement may be whether the steering angle is less than a reference value.

Further, the cornering escape end determination requirement may be whether the accelerator pedal displacement is greater than a reference value and the lateral acceleration variation is less than a reference value.

Advantageous Effects

As described above, an apparatus and method for controlling cornering of a vehicle according to the present disclosure are advantageous in that it is possible to determine whether circuit cornering driving is performed using only existing vehicle signals such as a cylinder pressure, an accelerator pedal displacement, a lateral acceleration variation, and a steering angle.

Further, the present disclosure is advantageous in that the damping force of a suspension is controlled to be reduced when it is determined that a vehicle enters circuit cornering, so that the rigidity of the suspension is reduced when entering circuit cornering, and thereby a load movement amount is reduced, a road grip force is improved, and a yaw response is improved.

Further, the present disclosure is advantageous in that understeer and oversteer can be improved by analyzing a driver's behavior and applying an optimal damping force for each driving state.

Further, circuit cornering control logic according to the present disclosure is advantageous in that understeer is reduced and followability is increased during circuit driving, so that lap time may be improved, and a response is improved at the time of initial steering input, and thereby corner entry and escape performance is improved.

Further, the circuit cornering control logic according to the present disclosure is advantageous in that it can be applied to a vehicle using only existing vehicle signals, so that an increase in production cost is not required.

DETAILED DESCRIPTION

Figure 1:
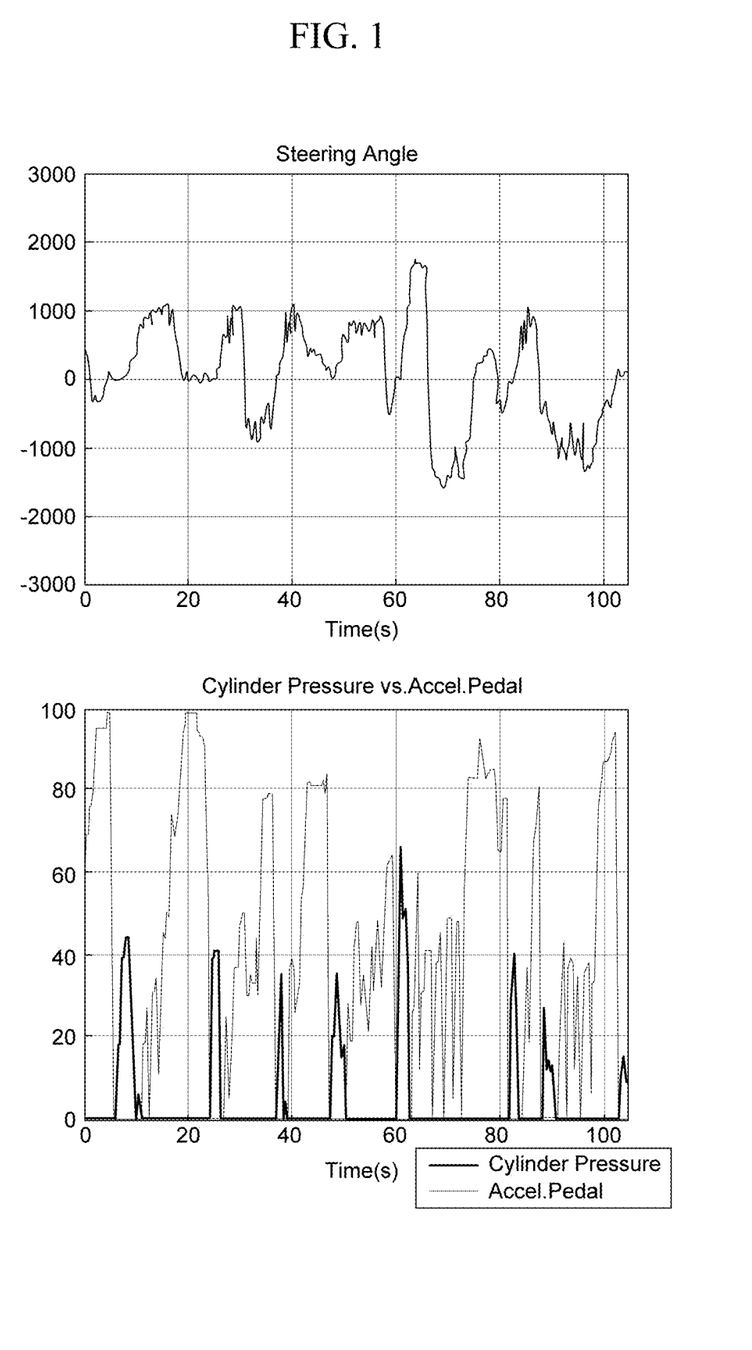
FIG. 1 is a graph showing a steering angle, a cylinder pressure, and an accelerator-pedal displacement pattern on a circuit driving road.

Hereinafter, an apparatus and method for controlling the cornering of a vehicle according to the present disclosure will be described in detail with reference to FIGS. 1 to 7. FIG. 1 shows a steering angle, a cylinder pressure, and an accelerator-pedal displacement pattern on a circuit driving road, and FIG. 2 is a graph showing an event occurrence pattern such as braking, acceleration, or steering on the circuit driving road of FIG. 1.

Referring to FIG. 1, it can be seen that the steering angle repeatedly increases whenever a vehicle enters cornering during circuit driving, a cylinder pressure increases and then decreases for a certain period of time before the vehicle enters cornering, and an accelerator pedal displacement increases after the vehicle enters cornering. Here, the cylinder pressure refers to braking pressure.

Figure 2:
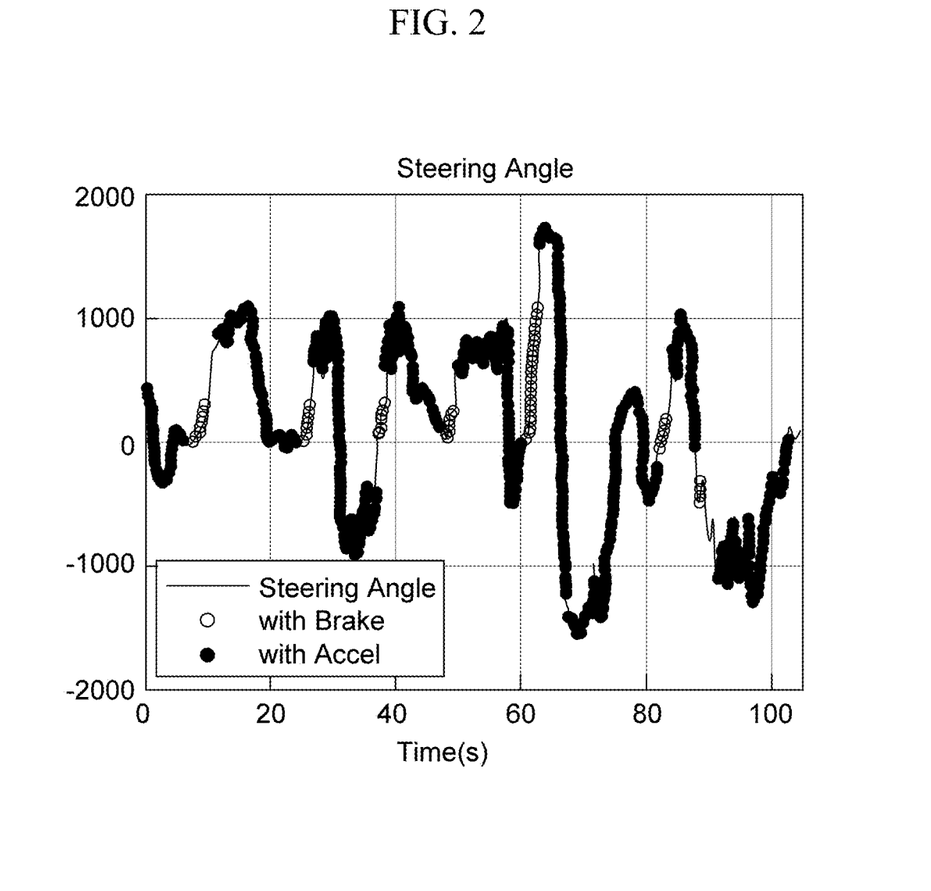
FIG. 2 is a graph showing an event occurrence pattern such as braking, acceleration, or steering on the circuit driving road of FIG. 1.

Referring to FIG. 2, patterns in which events such as braking, acceleration, and steering occur can be seen in detail. That is, deceleration due to braking tends to occur when the vehicle enters circuit cornering, and the vehicle tends to accelerate after entering cornering while the steering angle increases. It can be seen that the tendency is repeated whenever the vehicle enters the circuit cornering.

From the above circuit driving pattern, it can be seen that the circuit cornering driving is determined on the basis of the cylinder pressure, the accelerator pedal displacement, and the steering angle.

Figure 3:
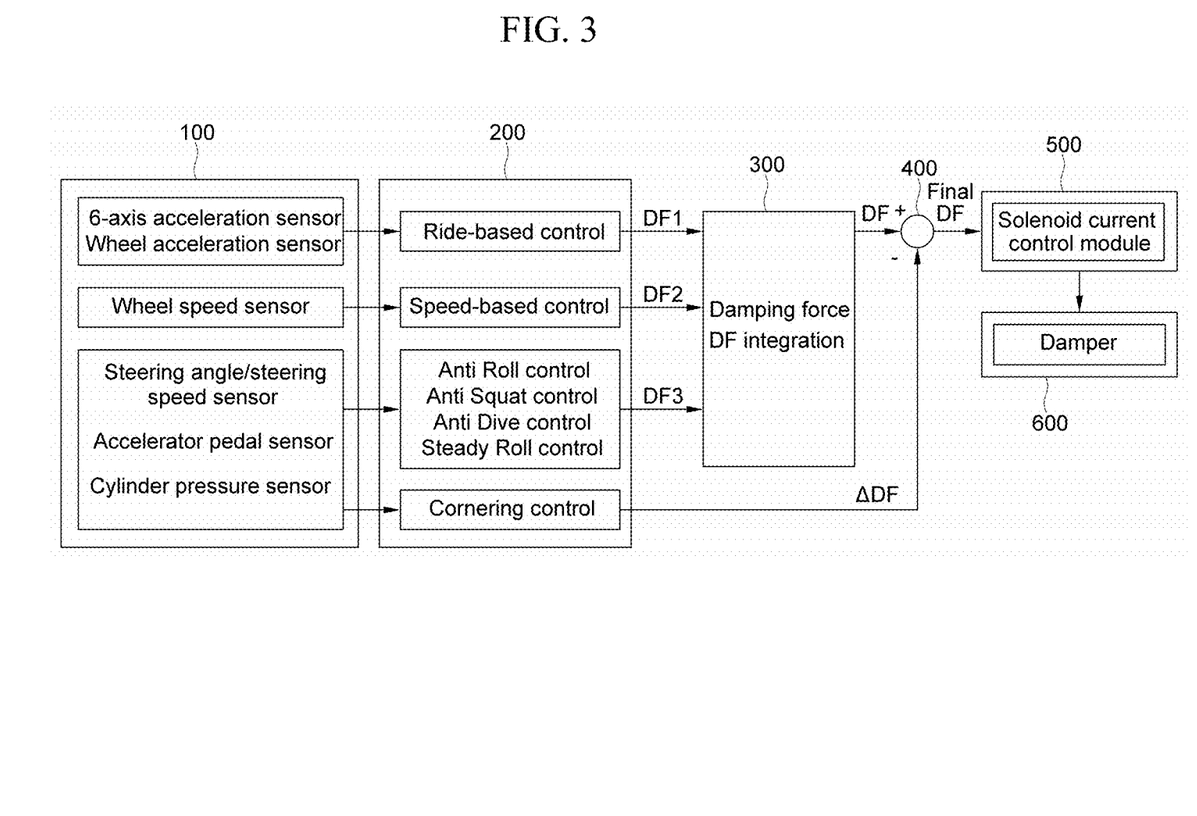
FIG. 3 is a diagram showing a circuit-cornering control apparatus according to an embodiment of the present disclosure.

FIG. 3 shows a circuit-cornering control apparatus according to an embodiment of the present disclosure. The circuit-cornering control apparatus includes an input unit 100, a control unit 200, an integration unit 300, an adjustment unit 400, a command unit 500, and a damping unit 600.

The input unit 100 is provided with a 6-axis acceleration sensor and a wheel acceleration sensor for sensing 6-axis acceleration and wheel acceleration, and is provided with a wheel speed sensor for sensing a wheel speed. Further, the input unit 100 is provided with a steering angle and steering speed sensor for sensing the steering angle and steering speed, an accelerator pedal sensor for sensing the accelerator pedal displacement, and a cylinder pressure sensor for sensing the cylinder pressure. The input unit 100 outputs signals sensed through each of the sensors to the control unit 200.

The control unit 200 receives various signals which are output from the input unit 100, and outputs a damping force DF through various controls. The control unit outputs a damping force DF1 through a ride-based control on the basis of 6-axis acceleration and wheel acceleration signals received from the input unit 100, outputs a damping force DF2 through a speed-based control on the basis of a wheel speed signal received from the input unit 100, and outputs a damping force DF3 through an anti-roll control, an anti-squat control, an anti-dive control, and a steady roll control on the basis of a steering angle and steering speed signal, an accelerator pedal displacement signal, and a cylinder pressure signal received from the input unit 100.

Further, the control unit 200 performs the cornering control on the basis of the steering angle and steering speed signal, the accelerator pedal displacement signal, and the cylinder pressure signal received from the input unit 100, and consequently outputs a damping force variation ΔDF.

The integration unit 300 receives a plurality of damping forces DF1, DF2, and DF3 which are output from the control unit 200, and outputs a damping force DF integrating the damping forces.

The adjustment unit 400 outputs a final damping force DF by applying the damping force variation ΔDF output from the control unit 200 to the damping force DF output from the integration unit 300.

The command unit 500 receives the final damping force which is output from the adjustment unit 400, and outputs a current control signal through a solenoid current control module.

The damping unit 600 receives the current control signal output from the command unit 500 to adjust the damping force of the damper. When it is determined that the vehicle enters the circuit cornering through the cornering control of the control unit 200, the damping force of the damper of the damping unit 600 is controlled to be reduced. That is, during circuit cornering driving, the damping force is reduced and suspension rigidity is reduced, so that a load movement amount is reduced, and thereby a road grip force is improved and eventually a yaw response is improved. If the vehicle drives in a normal straight and quick turn, the control is performed to increase the damping force as before, thereby minimizing a roll rate to improve straight driving performance after the quick turn.

As described above, the circuit-cornering control apparatus according to an embodiment of the present disclosure controls to reduce the damping force when the vehicle is driving in the circuit cornering through the cornering control of the control unit 200. Hereinafter, the logic for determining whether the circuit cornering driving is performed will be described.

Figure 4:
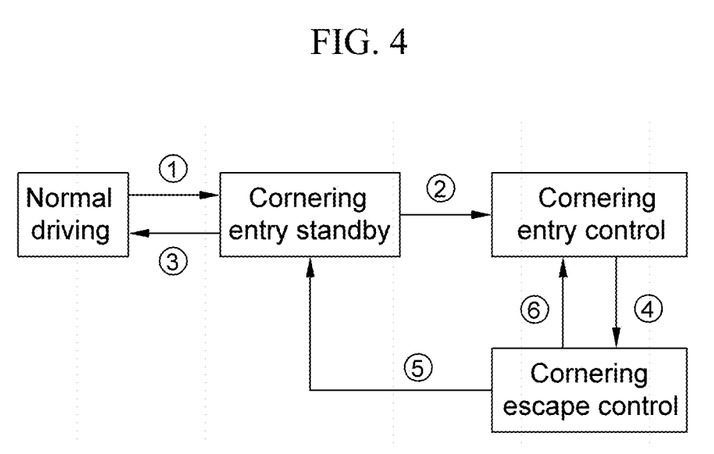
FIG. 4 is a diagram showing the flow of circuit-cornering driving determination logic through a driver driving pattern analysis according to an embodiment of the present disclosure.

FIG. 4 shows the flow of circuit-cornering driving determination logic through a driver driving pattern analysis according to an embodiment of the present disclosure. When a cornering entry standby determination requirement D1 is satisfied in a normal driving state, the state is changed to the circuit cornering entry standby state ①. When a cornering entry control determination requirement D2 is satisfied in this cornering entry standby state, the state is changed to the cornering entry control state ②. When the cornering entry control determination requirement is not satisfied, the state is changed to the normal driving state again ③. In the cornering entry control state, turning control is performed when entering circuit cornering, and acceleration control and deceleration control are performed during turning.

When a cornering escape determination requirement D3 is satisfied in the cornering entry control state, the state is changed to the cornering escape control state ④. When a cornering escape end determination requirement D4 is satisfied in the cornering escape control state, the state is changed to the cornering entry standby state ⑤. In contrast, when the cornering escape end determination requirement is not satisfied, the state is changed to the cornering entry control state ⑥.

Figure 5:
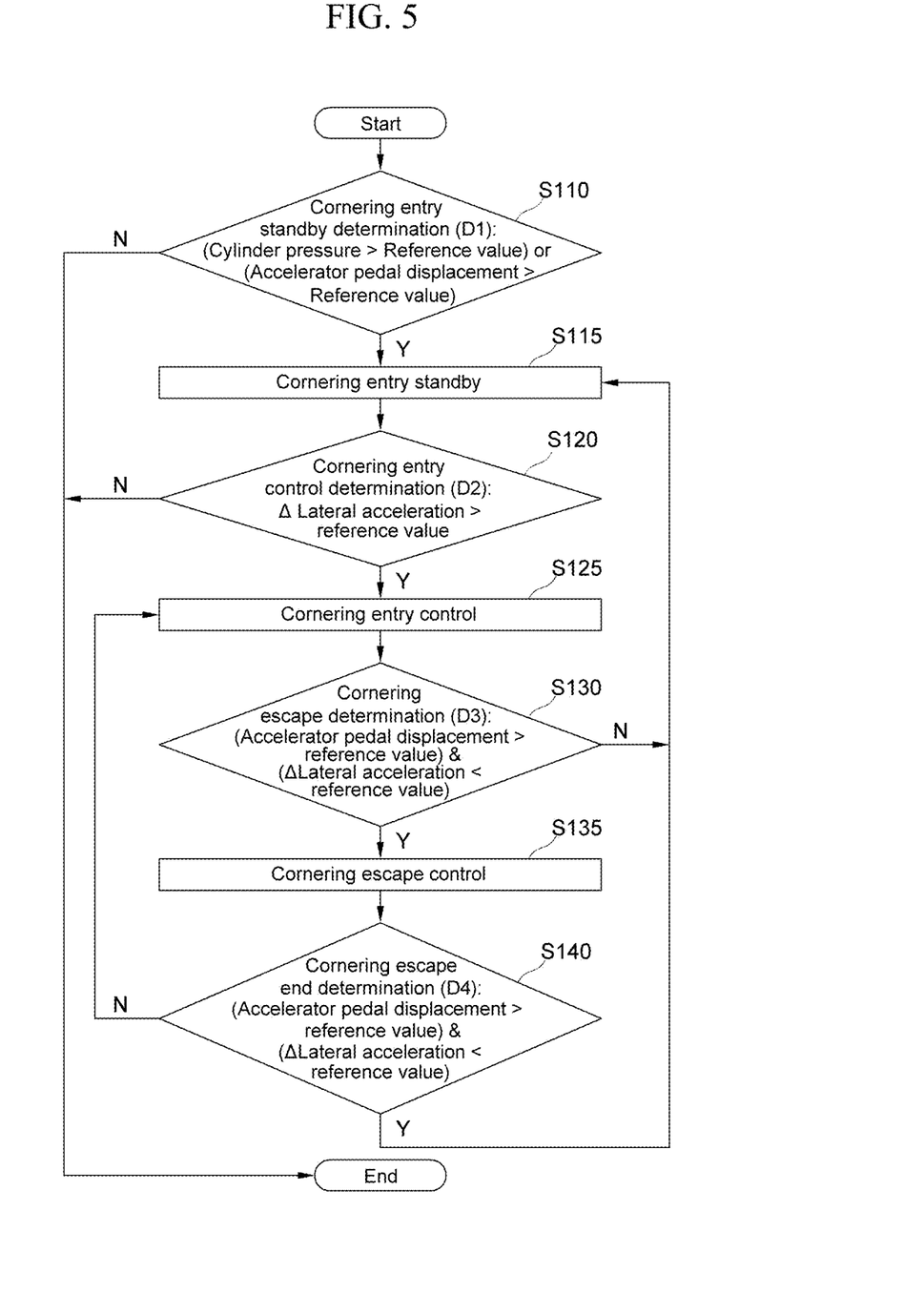
FIG. 5 is a flowchart of circuit-cornering driving determination control logic of FIG. 4.

FIG. 5 shows a flowchart of circuit-cornering driving determination control logic of FIG. 4. The circuit-cornering driving determination control logic will be described in detail with reference to FIG. 5. An embodiment of FIG. 5 is logic which analyzes a driver driving pattern on the basis of the cylinder pressure, the accelerator pedal displacement, and the lateral acceleration variation and then determines the circuit cornering driving.

In a cornering entry standby determining step S110, it is determined whether the cornering entry standby determination requirement D1 is satisfied during normal driving. The cornering entry standby determination requirement D1 is whether the cylinder pressure is greater than a reference value or the accelerator pedal displacement is greater than a reference value. When a condition where the cylinder pressure is greater than the reference value or the accelerator pedal displacement is greater than the reference value is satisfied, the process is changed to a cornering entry standby step S115. When the condition is not satisfied, the process returns to the normal driving state.

In the cornering entry standby step S115, the cornering entry control determining step S120 is performed.

In the cornering entry control determining step S120, it is determined whether the cornering entry control determination requirement D2 is satisfied. The cornering entry control determination requirement D2 is whether the lateral acceleration variation is greater than a reference value. When a condition where the lateral acceleration variation is greater than a reference value is satisfied, the process is changed to a cornering entry control step S125. When the condition is not satisfied, the process is changed to the normal driving state.

In the cornering entry control step S125, the cornering escape determining step S130 is performed.

In the cornering escape determining step S130, it is determined whether the cornering escape determination requirement D3 is satisfied. The cornering escape determination requirement D3 is whether the accelerator pedal displacement is greater than the reference value and the lateral acceleration variation is less than the reference value. When a condition where the accelerator pedal displacement is greater than the reference value and the lateral acceleration variation is less than the reference value is satisfied, the process is changed to a cornering escape control step S135. When the condition is not satisfied, the process is changed to the cornering entry standby step S115.

In the cornering escape control step S135, a cornering escape end determining step S140 is performed.

In the cornering escape end determining step S140, it is determined whether the cornering escape end determination requirement D4 is satisfied. The cornering escape end determination requirement D4 is whether the accelerator pedal displacement is greater than the reference value and the lateral acceleration variation is less than the reference value. When a condition where the accelerator pedal displacement is greater than the reference value and the lateral acceleration variation is less than the reference value is satisfied, the process is changed to the cornering entry standby step S115. When the condition is not satisfied, the process is changed to the cornering entry control step S125.

The above-described embodiment of FIGS. 4 and 5 is logic which determines circuit cornering driving by analyzing the driver driving pattern on the basis of the cylinder pressure, the accelerator pedal displacement, and the lateral acceleration variation.

The circuit-cornering driving determination logic from the driver driving pattern including the steering angle as well as the cylinder pressure, the accelerator pedal displacement, and the lateral acceleration variation will be described with reference to FIGS. 6 and 7.

Figure 6:
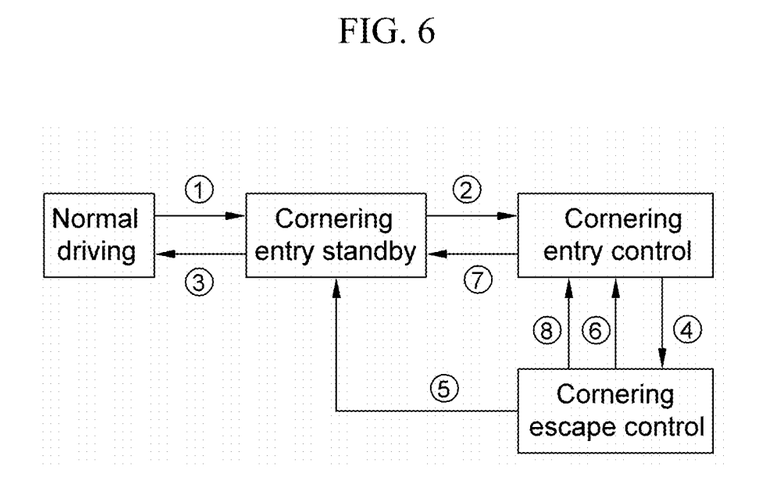
FIG. 6 is a diagram showing the flow of circuit-cornering driving determination logic through a driver driving pattern analysis according to another embodiment of the present disclosure.

FIG. 6 shows the flow of circuit-cornering driving determination logic through a driver driving pattern analysis according to another embodiment of the present disclosure. In the normal driving state, when the cornering entry standby determination requirement D1 is satisfied, the process is changed to the circuit cornering entry standby state ①. In the cornering entry standby state, when the cornering entry control determination requirement D2 is satisfied, the process is changed to the cornering entry control state ②. When the requirement is not satisfied, the process is changed to the normal driving state again ③. In the cornering entry control state, turning control is performed when entering circuit cornering, and acceleration control and deceleration control are performed during turning.

When a cornering entry standby determination requirement D1' is satisfied in the cornering entry control state, cornering escape determination is performed. When the requirement is not satisfied, the process is changed to the cornering entry standby state ⑦. When the cornering escape determination is performed and the cornering escape determination requirement D3 is satisfied, the process is changed to the cornering escape control state ④.

When a cornering entry control determination requirement D2' is satisfied in the cornering escape control state, the cornering escape end determination is performed. When the requirement is not satisfied, the process is changed to the cornering entry control state ⑧. When the cornering escape end determination is performed and the cornering escape end determination requirement D4 is satisfied, the process is changed to the cornering entry standby state ⑤. When the requirement is not satisfied, the process is changed to the cornering entry control state ⑥.

The embodiment of FIG. 6 is different from the embodiment of FIG. 4 in that the process is changed to the cornering entry standby state ⑦ when the cornering entry standby determination requirement D1' is not satisfied in the cornering entry control state, and the process is changed to the cornering entry control state ⑧ when the cornering entry control determination requirement D2' is not satisfied in the cornering escape control state. The added determination requirements D1' and D2' are related to the steering angle.

Hereinafter, another embodiment of the present disclosure will be described in detail with reference to FIG. 7 which shows the flowchart of circuit-cornering driving determination control logic through a driver driving pattern analysis.

Figure 7:
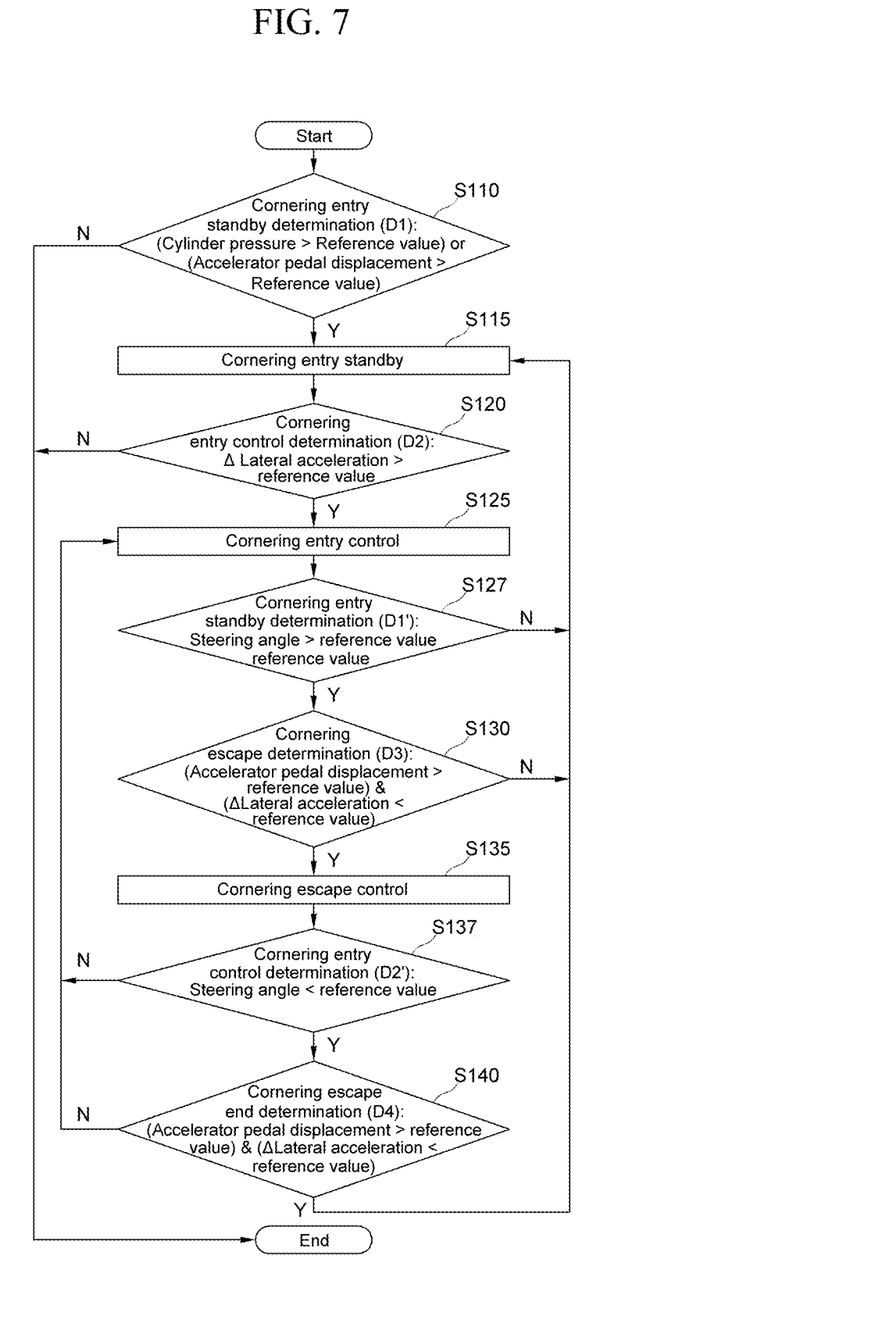
FIG. 7 is a flowchart of circuit-cornering driving determination control logic of FIG. 6.

The embodiment of FIG. 7 is logic which determines circuit cornering driving by analyzing a driver driving pattern on the basis of a cylinder pressure, an accelerator pedal displacement, a lateral acceleration variation, and a steering angle.

In the cornering entry standby determining step S110, it is determined whether the cornering entry standby determination requirement D1 is satisfied during normal driving. The cornering entry standby determination requirement D1 is whether the cylinder pressure is greater than the reference value or the accelerator pedal displacement is greater than the reference value. When a condition where the cylinder pressure is greater than the reference value or the accelerator pedal displacement is greater than the reference value is satisfied, the process is changed to the cornering entry standby step S115. When the condition is not satisfied, the process returns to the normal driving state.

In the cornering entry standby step S115, the cornering entry control determining step S120 is performed.

In the cornering entry control determining step S120, it is determined whether the cornering entry control determination requirement D2 is satisfied. The cornering entry control determination requirement D2 is whether the lateral acceleration variation is greater than the reference value. When a condition where the lateral acceleration variation is greater than the reference value is satisfied, the process is changed to the cornering entry control step S125. When the condition is not satisfied, the process is changed to the normal driving state.

In the cornering entry control step S125, the cornering entry standby determining step S127 is performed. In the cornering entry standby determining step S127, it is determined whether the cornering entry standby determination requirement D1' is satisfied. The cornering entry standby determination requirement D1' is whether the steering angle is greater than the reference value. When a condition where the steering angle is greater than the reference value is satisfied, the cornering escape determining step S130 is performed. When the condition is not satisfied, the process is changed to the cornering entry standby step S115.

In the cornering escape determining step S130, it is determined whether the cornering escape determination requirement D3 is satisfied. The cornering escape determination requirement D3 is whether the accelerator pedal displacement is greater than the reference value and the lateral acceleration variation is less than the reference value. When a condition where the accelerator pedal displacement is greater than the reference value and the lateral acceleration variation is less than the reference value is satisfied, the process is changed to the cornering escape control step S135. When the condition is not satisfied, the process is changed to the cornering entry standby step S115.

In the cornering escape control step S135, the cornering entry control determining step S137 is performed. In the cornering entry control determining step S137, it is determined whether the cornering entry control determination requirement D2' is satisfied. The cornering entry control determination requirement D2' is whether the steering angle is less than the reference value. When a condition where the steering angle is less than the reference value is satisfied, the cornering escape end determining step S140 is performed. When the condition is not satisfied, the process is changed to the cornering entry control step S125.

In the cornering escape end determining step S140, it is determined whether the cornering escape end determination requirement D4 is satisfied. The cornering escape end determination requirement D4 is whether the accelerator pedal displacement is greater than the reference value and the lateral acceleration variation is less than the reference value. When a condition where the accelerator pedal displacement is greater than the reference value and the lateral acceleration variation is less than the reference value is satisfied, the process is changed to the cornering entry standby step S115. When the condition is not satisfied, the process is changed to the cornering entry control step S125.

As described above, according to embodiments of the present disclosure, it is possible to determine whether circuit cornering driving is performed by analyzing a driver driving pattern on the basis of a cylinder pressure, an accelerator pedal displacement, a lateral acceleration variation, and a steering angle through circuit cornering control logic, and the damping force of a suspension can be controlled to be reduced when it is determined that a vehicle enters circuit cornering. In this case, the rigidity of the suspension is reduced when entering circuit cornering, and thereby a load movement amount is reduced, a road grip force is improved, and a yaw response is improved.

Further, understeer and oversteer can be improved by analyzing a driver's behavior and applying an optimal damping force for each driving state.

Meanwhile, according to circuit cornering control logic of the present disclosure, understeer is reduced and followability is increased during circuit driving, so that lap time may be improved, and a response is improved at the time of initial steering input, and thereby corner entry and escape performance is improved.

The circuit cornering control logic according to the present disclosure can be applied to a vehicle using only existing vehicle signals, so that an increase in production cost is not required and industrial applicability is high.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

DETAILED DESCRIPTION OF MAIN ELEMENTS

100: input unit
200: control unit
300: integration unit
400: adjustment unit
500: command unit
600: damping unit

What is claimed is:

1. An apparatus for controlling cornering of a vehicle, the apparatus comprising:
   an input unit configured to sense and output a plurality of vehicle signals;
   a control unit configured to receive the plurality of vehicle signals output from the input unit, to output each of damping forces obtained through a plurality of controls performed on the basis of the plurality of vehicle signals, and to output a damping force variation calculated through a cornering control performed on the basis of some of the plurality of vehicle signals;
   an integration unit configured to integrate each of the damping forces output from the control unit, and to output an integrated damping force;
   an adjustment unit configured to apply the damping force variation output from the control unit to the damping force output from the integration unit and then output a final damping force;
   a command unit configured to receive the final damping force output from the adjustment unit and then output a changed current signal; and
   a damping unit configured to receive the current signal output from the command unit and then adjust a damping force of a damper,
   wherein the damping force of the damper of the damping unit is controlled to be reduced when it is determined that the vehicle enters circuit cornering through the cornering control.

2. The apparatus of claim 1, wherein the plurality of vehicle signals sensed by the input unit comprises signals of 6-axis acceleration, wheel acceleration, wheel speed, steering angle, steering speed, accelerator pedal displacement, and cylinder pressure.

3. The apparatus of claim 2, wherein said some of the signals which are the basis for performing the cornering control in the control unit comprise signals of lateral acceleration variation, accelerator pedal displacement, and cylinder pressure.

4. The apparatus of claim 3, wherein said some of the signals which are the basis for performing the cornering control further comprise a steering angle.

5. A vehicle cornering control method for determining cornering driving of a vehicle, the method comprising:
   a cornering entry standby determining step of determining whether a cornering entry standby determination requirement of the vehicle is satisfied during normal driving, and returning to a normal driving state when the cornering entry standby determination requirement is not satisfied;
   a cornering entry standby step performed when the cornering entry standby determination requirement is satisfied;
   a cornering entry control determining step of determining whether a cornering entry control determination requirement is satisfied, and changing to a normal driving state when the cornering entry control determination requirement is not satisfied;
   a cornering entry control step performed when the cornering entry control determination requirement is satisfied;
   a cornering escape determining step of determining whether a cornering escape determination requirement is satisfied, and changing to the cornering entry standby step when the cornering escape determination requirement is not satisfied;

a cornering escape control step performed when the cornering escape determination requirement is satisfied; and a cornering escape end determining step of determining whether a cornering escape end determination requirement is satisfied, changing to the cornering entry standby step when the cornering escape end determination requirement is satisfied, and changing to the cornering entry control step when the requirement is not satisfied, wherein a damping force of a damper is controlled to be reduced in the cornering entry control step.

6. The method of claim 5, wherein the cornering entry standby determination requirement of the vehicle is whether cylinder pressure is greater than a reference value or accelerator pedal displacement is greater than a reference value.

7. The method of claim 6, wherein the cornering entry control determination requirement is whether lateral acceleration variation is greater than a reference value.

8. The method of claim 7, wherein the cornering escape determination requirement is whether the accelerator pedal displacement is greater than a reference value and the lateral acceleration variation is less than a reference value.

9. The method of claim 8, wherein the cornering escape end determination requirement is whether the accelerator pedal displacement is greater than a reference value and the lateral acceleration variation is less than a reference value.

10. A vehicle cornering control method for determining cornering driving of a vehicle, the method comprising:

a cornering entry standby determining step of determining whether a cornering entry standby determination requirement of the vehicle is satisfied during normal driving, and returning to a normal driving state when the cornering entry standby determination requirement is not satisfied;

a cornering entry standby step performed when the cornering entry standby determination requirement is satisfied;

a cornering entry control determining step of determining whether a cornering entry control determination requirement is satisfied, and changing to a normal driving state when the cornering entry control determination requirement is not satisfied;

a cornering entry control step performed when the cornering entry control determination requirement is satisfied;

a cornering entry standby determining step of determining whether a cornering entry standby determination requirement is satisfied, and changing to the cornering entry standby step when the cornering entry standby determination requirement is not satisfied;

a cornering escape determining step performed when the cornering entry standby determination requirement is satisfied, determining whether a cornering escape determination requirement is satisfied, and changing to the cornering entry standby step when the cornering escape determination requirement is not satisfied;

a cornering escape control step performed when the cornering escape determination requirement is satisfied;

a cornering entry control determining step of determining whether a cornering entry control determination requirement is satisfied, and changing to the cornering entry control step when the cornering entry control determination requirement is not satisfied; and a cornering escape end determining step performed when the cornering entry control determination requirement is satisfied, determining whether a cornering escape end determination requirement is satisfied, changing to the cornering entry standby step when the cornering escape end determination requirement is satisfied, and changing to the cornering entry control step when the requirement is not satisfied, wherein a damping force of a damper is controlled to be reduced in the cornering entry control step.

11. The method of claim 10, wherein the cornering entry standby determination requirement of the vehicle is whether cylinder pressure is greater than a reference value or accelerator pedal displacement is greater than a reference value.

12. The method of claim 11, wherein the cornering entry control determination requirement is whether lateral acceleration variation is greater than a reference value.

13. The method of claim 12, wherein the cornering entry standby determination requirement is whether a steering angle is greater than a reference value.

14. The method of claim 13, wherein the cornering escape determination requirement is whether the accelerator pedal displacement is greater than a reference value and the lateral acceleration variation is less than a reference value.

15. The method of claim 14, wherein the cornering entry control determination requirement is whether the steering angle is less than a reference value.

16. The method of claim 15, wherein the cornering escape end determination requirement is whether the accelerator pedal displacement is greater than a reference value and the lateral acceleration variation is less than a reference value.

* * * * *